United States Patent [19]

Tokoro et al.

[11] Patent Number: 5,679,450
[45] Date of Patent: Oct. 21, 1997

[54] EXPANDED POLYOLEFIN BODY HAVING THERMOSETTING RESIN LAYER DIRECTLY BONDED THERETO

[75] Inventors: Hisao Tokoro, Tochigi-ken; Hidehiro Sasaki; Masakazu Sakaguchi, both of Utsunomiya, all of Japan

[73] Assignee: JSP Corporation, Japan

[21] Appl. No.: 498,115

[22] Filed: Jul. 5, 1995

[30] Foreign Application Priority Data

Jul. 15, 1994 [JP] Japan .................. 6-186400

[51] Int. Cl.$^6$ .................. B32B 5/18; B32B 9/04
[52] U.S. Cl. .................. 428/304.4; 428/306.6; 428/309.9; 428/315.9; 428/327; 428/411.1; 428/420; 428/424.8; 428/482; 428/308.4; 521/56; 521/59; 521/60
[58] Field of Search .................. 428/306.6, 315.9, 428/327, 411.1, 304.4, 482, 308.4, 309.9, 420, 424.8; 521/56, 59, 60

[56] References Cited

U.S. PATENT DOCUMENTS

| | | | |
|---|---|---|---|
| 4,142,956 | 3/1979 | Shikinami et al. | 521/140 |
| 4,262,052 | 4/1981 | Fannan et al. | 428/306 |
| 4,298,706 | 11/1981 | Ueno et al. | 521/92 |

FOREIGN PATENT DOCUMENTS 54-111567  8/1979  Japan .................. 525/240

*Primary Examiner*—Cecilia J. Tsang
*Assistant Examiner*—Patrick R. Delaney
*Attorney, Agent, or Firm*—Lorusso & Loud

[57] ABSTRACT

A composite material is disclosed which comprises a shaped, expanded body having a closed cellular structure, and a layer of a thermosetting resin directly bonded to a surface of the shaped body, wherein the shaped body is formed of a mixed thermoplastic resin having a xylene-insoluble content of not greater than 1% by weight and containing at least 50% by weight of a polyolefin resin and at least 2% by weight of a polyene polymer having vinyl group-containing side chains.

11 Claims, No Drawings

EXPANDED POLYOLEFIN BODY HAVING THERMOSETTING RESIN LAYER DIRECTLY BONDED THERETO

BACKGROUND OF THE INVENTION

This invention relates to a composite material having a shaped, expanded polyolefin body to which a thermosetting resin layer is directly bonded.

A composite material having a core layer of a shaped, expanded resin and an unsaturated polyester layer surrounding the core layer is now utilized for a variety of applications such as bathtubs, fish boxes and construction materials, because of its lightness in weight, good heat insulating properties, high mechanical strengths and good sound-proofing properties.

One known composite material includes a core of a hard polyurethane foam covered with a cured layer of an unsaturated polyester resin. Because the polyurethane foam is relatively expensive and is easily hydrolyzable, the known composite material is ill-suited for use in the above-mentioned applications.

There has been a proposal to use a shaped, expanded polystyrene in place of the polyurethane foam. However, the polystyrene shaped body is soluble in a vinyl monomer used both as a solvent and as a crosslinking agent for the unsaturated polyester resin, the polystyrene-unsaturated polyester composite material is not used in practice.

To cope with this problem, JP-B-59-40622 suggests the use of a shaped, expanded, styrene-grafted polyethylene as a core layer. The known composite material, however, has problems that the core layer is shrunk during lamination of the unsaturated polyester layer thereon, that pin holes are apt to be formed in the polyester layer, that the adhesion strength between the core layer and the polyester layer is still unsatisfactory and that the core layer is soluble in a vinyl monomer contained in the unsaturated polyester resin.

JP-A-62-190236 suggests a shaped, expanded, styrene- or methyl methacrylate-grafted, crosslinked polyolefin as a core layer. Because of the crosslinkages, the thermal shrinkage of the core layer is only below 5% at 100° C. However, the use of crosslinked resin is not advantageous from the standpoint of economy.

SUMMARY OF THE INVENTION

It is, therefore, the prime object of the present invention to provide a composite material which has a shaped, expanded layer having a surface covered with a thermosetting resin layer and which is devoid of the defects of the conventional composite materials.

Another object of the present invention is to provide a composite material of the above-mentioned type which can be produced at low costs and which can exhibit high mechanical strengths.

It is a specific object of the present invention to provide a composite material of the above-mentioned type in which the protecting layer is firmly bonded to the expanded layer.

In accomplishing the foregoing objects, the present invention provides a composite material including a shaped, expanded body having a closed cellular structure, and a layer of a thermosetting resin directly bonded to a surface of the shaped body, wherein the shaped body is formed of a mixed thermoplastic resin containing at least 50% by weight of a polyolefin resin and at least 2% by weight of a polyene polymer having vinyl group-containing side chains.

It has now been found that when an expanded shaped body is formed of a mixed thermoplastic resin containing a polyolefin resin and a polyene polymer having vinyl group-containing side chains, a thermosetting resin layer can be composited on a surface thereof with firm bonding being established therebetween. The vinyl groups on the side chains of the polyene polymer probably account for the establishment of the firm bonding, since no improvement of the bonding strength is seen when 1,4-polybutadiene is substituted for 1,2-polybutadiene.

The term "xylene-insoluble content" used in the specification herein is as measured by the following method:

Sample resin is immersed in boiling xylene for 8 hours. The mixture is then immediately filtered through a 200 mesh (74 µm) were net sieve as specified in Japanese Industrial Standards JIS Z 8801 (1966). The weight of the xylene-insoluble matters left on the sieve is measured. The xylene-insoluble content P is defined as follows:

$$P(\%)=(M/L)\times 100$$

wherein M represents the weight (g) of the xylene-insoluble matters and L represents the weight (g) of the sample.

The xylene insoluble content of the mixed resin shaped body is substantially the same as that of the mixed resin particles from which the shaped body has been molded.

Whether or not a given polyene polymer has vinyl group-containing side chains can be easily confirmed by differential scanning calorimetry.

Other objects, features and advantages of the present invention will become apparent from the detailed description of the preferred embodiments to follow.

DETAILED DESCRIPTION OF THE PREFERRED EMBODIMENTS OF THE INVENTION

The composite material according to the present invention includes a shaped, expanded body having a closed cellular structure and a thermosetting resin layer provided over a surface of the expanded body.

The shaped body is formed of a mixed thermoplastic resin containing (a) at least 50% by weight, preferably 55–95% by weight, of a polyolefin resin and (b) at least 2% by weight, preferably 5–45% by weight, of a polyene polymer having vinyl group-containing side chains. At least 2% by weight of the polyene polymer (b) is necessary to obtain satisfactory adhesion between the shaped body and the thermosetting resin layer. However, too high a content of the polyene polymer in excess of 50% by weight causes the narrowing of the optimum molding temperature range so that the adhesion between the particles of the expanded body is apt to be lowered or a shrinkage of the expanded body is apt to result.

The polyene polymer (b) is a homopolymer or copolymer containing a monomer unit having at least two double bonds. The monomer generally has 4–12 carbon atoms, preferably 4–6 carbon atoms. Illustrative of suitable monomers are butadiene, pentadiene, hexadiene, hexatriene, cyclopentadiene and cyclohexadiene. Particularly preferred is the use of butadiene. Thus, the polyene polymer may be obtained by polymerizing one of the above monomers, by copolymerizing at least two of the above monomers or by copolymerizing at least one of the above monomers with at least one of other comonomers such as lower olefins (e.g. ethylene and propylene). The most preferable polyene polymer is a 1,2-polybutadiene. 1,4-Polybutadiene which has no vinyl group-containing side chains is excluded from the scope of the polyene polymer.

When the polyene polymer (b) has a melting point, it is desirable that the melting point is lower than that of the polyolefin (a) which is another constituent of the mixed thermoplastic resin. The polyene polymer generally has a melt flow index (MFI) of 0.1–13 g/10 minutes, preferably 0.5–5 g/10 minutes.

The polyolefin (a) is a polymer or copolymer containing a monoolefin monomer unit having 2–10 carbon atoms. Illustrative of suitable polyolefins are high density polyethylenes having a density of generally 0.935–0.970 g/cm$^3$, linear low density polyethylenes having a density of generally 0.910–0.934 g/cm$^3$, polypropylenes, propylene-olefin random copolymers and propylene-olefin block copolymers. The typical example of the high density polyethylene is an ethylene-α-olefin random copolymer having an α-olefin content of 0.5–10% by weight. The typical example of the propylene-olefin random copolymer is a propylene-α-olefin random copolymer having an α-olefin content of 0.5–10% by weight. The typical example of the propylene-olefin block copolymer is a propylene-α-olefin block copolymer having an α-olefin content of 0.5–30% by weight. The number of the carbon atoms of the α-olefin is preferably not greater than 10. Above all, the use of propylene-α-olefin random copolymer is particularly preferred for reasons of high adhesion between the expanded body and the protecting layer.

The polyolefin (a) generally has a melting point of 100°–180° C. and MFI of 0.1–100 g/10 minutes. Preferably, the melting point is 110°–160° C. and MFI is 1–50 g/10 minutes, for reasons of thermal stability and easiness of expansion.

The mixed resin should have a xylene-insoluble content of not greater than 1% by weight. This requirement can be met by using non-crosslinked polyolefin (a) and non-crosslinked polyene polymer (b).

In addition to the polyolefin (a and the polyene polymer (b), the mixed thermoplastic resin may contain an additional polymer (c) such as a synthetic rubber, a polyester, a halogenated vinyl polymer having 1 or 2 halogen atoms in each monomer unit constituting the polymer, a modified cellulose polymer or a modified acrylic polymer in an amount of up to 30% by weight.

The composite material according to the present invention may be produced by the following method.

The mixed resin is melted and kneaded in an extruder and pelletized in any known manner. The pellets are then expanded. Thus, the resin pellets are dispersed in a dispersing medium contained in an autoclave. A blowing agent is fed to the autoclave and the dispersion in the autoclave is heated at a temperature higher than the pellets to impregnate the pellets with the blowing agent. An outlet port provided in a bottom portion of the autoclave is the opened to discharge the dispersion into the atmosphere, so that the pellets are expanded. The term "softening point" used herein is intended to mean a value measured in accordance ASTM D648 with a load of 4.6 Kg/cm$^2$.

As the blowing agent, an organic blowing agent, an inorganic blowing agent or a mixture thereof may be used. Examples of the organic blowing agent include propane, butane, pentane, hexane, cyclobutane, cyclohexane, trichlorofluoromethane, dichlorodifluoromethane, chlorodifluoromethane, trifluoromethane, 1,1-difluoroethane, 1,2,2,2-tetrafluoroethane, 1-chloro-1,1-difluoroethane, 1,2,2,2-tetrafluoroethane and 1-chloro-1,2,2,2-tetrafluoroethane. Examples of inorganic gas blowing agent include air, nitrogen, carbon dioxide and argon. The amount of the blowing agent varies with the intended expansion ratio and expansion temperature and is generally in the range of 2–50% by weight based on the mixed resin pellets.

The dispersing medium is a liquid in which the mixed resin pellets are insoluble and may be, for example, water, ethylene glycol, glycerin, methanol, ethanol or a mixture thereof. The dispersing medium is used in an amount of 1.5–10 times, preferably 2–5 times, the weight of the mixed resin pellets.

To prevent melt-adhesion of the resin pellets with each other during the impregnation of the pellets with the blowing and during the expansion of the impregnated pellets, it is advisable to add to the dispersion finely divided solids which do not soften or melt during the expansion step. Illustrative of suitable solids are kaolin, talc, mica, alumina, titania and aluminum hydroxide. Such finely divided solid particles preferably have a particle size of less than 70 μm, more preferably less than 50 μm, most preferably 0.001 to 30 μm and may be used in an amount of 0.01 to 10 parts by weight per 100 parts by weight of the mixed resin pellets. An anionic surfactant such as sodium dodecylbenzenesulfonate or sodium oleate may be suitably used in combination with the above solids for further improving the adhesion-preventing effect. Such a surfactant is used in an amount of 0.001 to 5 parts by weight per 100 parts by weight of the mixed resin pellets.

It is preferred that the mixed resin pellets which are subjected to the expansion step have secondary crystals since the resulting expanded particles may exhibit excellent moldability and afford molded body with an excellent dimensional stability. When the mixed resin pellets prior to the expansion contain secondary crystals, then the resulting expanded particles also contain secondary crystals.

Whether or not the expanded particles produced contain secondary crystals can be tested by differential scanning calorimetry (DSC) techniques. For this purpose, the expanded resin particles sample (1 to 5 mg) is heated at a rate of 10° C./min to 220° C. using a differential scanning calorimeter while measuring the temperature of the sample and the heat required for heating the sample. The results are plotted with the temperature as abscissa and the heat as ordinate to give a curve (first DSC curve). The heated sample is then cooled at a rate of 10° C./min to about 40° C. Thereafter, the sample is again heated in the same manner as in the first heating stage as mentioned above to give a second DSC curve.

Each of the first and second DSC curves has a peak (characteristic peak) which is responsible for the absorption of heat during the melting of the resin and which is characteristic to the resin. The temperature at the characteristic peaks in the first and second DSC curves are the same or different from each other. The difference is below 5° C., generally below 2° C., however. The temperature at which the curve reached to the base line is termed "melt-completion temperature".

When the sample contains secondary crystals, there is a peak (high temperature peak) in the first DSC curve at a temperature higher than that of the characteristic peak. The high temperature peak is attributed to the absorption of heat for the destruction of the secondary crystals. Thus, the existence or non-existence of the secondary crystals can be seen from the presence or absence of the high temperature peak. That is, if the first DSC curve shows substantially no such high temperature peak, then the sample is regarded as containing substantially no secondary crystals. The second DSC curve shows no such high temperature peak because the secondary crystals if any have been destroyed during the first heating stage. It is preferred that the difference in temperature between the high temperature peak and characteristic peak of the second DSC curve be great because the greater the difference the more stable are the secondary crystals. The difference is preferably over 5° C., more preferably over 10° C.

The secondary crystals may be formed by maintaining the dispersion containing the mixed resin pellets at a temperature between a temperature 20 ° C. lower than the characteristic peak in the second DSC curve and the melt-completion temperature of the resin for a period of time of 5–90 min, preferably 15–60 min. The optimum secondary crystal forming temperature depends upon the kinds of the blowing agent and the resin and is appropriately selected from the above range. By allowing the secondary crystals to form and grow sufficiently, even when the dispersion is heated to an expansion temperature which is higher than the melt-completion temperature, the resultant expanded particles may still contain the secondary crystals which remain undestroyed during the expansion step.

In the first DSC curve of the mixed resin particles measured up to about 500° C., there exists a peak (reaction peak) at a temperature much higher than the high temperature peak. Such a reaction peak is also present in a DSC curve of the shaped expanded body obtained from the mixed resin particles. The reaction peak is characteristic to a polyene polymer having vinyl group-containing side chains. Without vinyl group-containing side chains, no reaction peak is present in the DSC curve. In the second DSC curve, the reaction peak is not present or only a weak reaction peak is present. The reaction peak is considered to be ascribed to the heat generated by reaction of the vinyl groups of the polyene polymer. The area of the reaction peak represents the heat generated by the reaction of the vinyl groups. It is preferred that the polyene polymer used in the present invention have vinyl group-containing side chains in such an amount so that the reaction peak has a calorific value of in the range of 15 J/g to 420 J/g (Joule per gram of the mixed resin particles).

As described previously, the expansion temperature is generally higher than the softening point of the mixed resin. A suitable expansion temperature varies with the kind of the blowing agent employed. For the expansion of non-crosslinked polypropylene resin is used as the non-crosslinked polyolefin, the expansion temperature is preferably between a temperature about 5° C. lower, more preferably 3° C. lower than the melting point and a temperature about 15° C. higher, more preferably about 10° C. higher than the melting point in the case where an inorganic gas is used by itself as the blowing agent. The rate at which the mixed resin pellets dispersion is heated is generally 1°–10° C. per minute, preferably 2°–5° C. per minute.

The thus produced expanded particles generally have an average pore diameter of 10–500 µm and a bulk density of 0.009–0.3 g/cm³, though these values vary with the kind of the blowing agent used.

The expanded particles are then placed in a mold cavity and heated so that the particles are expanded and fused bonded to each other, thereby to form a shaped, expanded body having a closed cellular structure. The molding temperature is generally between a temperature lower by 15° C. than the melting point of the mixed resin pellets from which the expanded particles have been prepared and a temperature higher by 15° C. than the melting point.

A thermosetting resin layer is then composited on a surface of the thus obtained expanded body in any known manner to obtain the composite material according to the present invention.

A resin injection molding, a resin transfer molding, a hand lay-up method or a spray lay-up method may be suitably employed. In the injection molding, a shaped, expanded body having a predetermined shape is placed in a mold cavity. A liquid thermosetting resin composition is then injected into the mold cavity to fill the space defined between the inside wall of the mold and the outer surface of the expanded body and, thereafter, hardened to obtain a composite material. If desired, a reinforcing material such as carbon fibers and glass fibers may be inserted into the space between the mold and the expanded body to form a reinforced thermosetting resin layer on the surface of the expanded body. After the completion of the curing, the hardened body may be subjected to forced aging by heating the mold at 60°–100° C. for 5–60 minutes, if desired.

The thermosetting resin may be, for example, an unsaturated polyester resin, an epoxy resin, a vinyl ester resin, a phenol resin, a silicone resin, an allyl resin or a polyimide resin. Above all, the use of an unsaturated polyester resin is preferred. As well known, a liquid unsaturated polyester resin composition includes an unsaturated polyester obtained by polycondensation of a saturated dibasic acid, an unsaturated dibasic acid and a glycol, a polymerization catalyst, and a vinyl monomer into which the polyester is dissolved. Illustrative of suitable saturated dibasic acids are phthalic anhydride, isophthalic acid, adipic acid, tetrahydrophthalic anhydride, chlorendic anhydride, acid, tetrabromophthalic anhydride. Illustrative of suitable unsaturated dibasic acids are maleic anhydride and fumaric acid. Illustrative of suitable glycols are ethylene glycol, propylene glycol, trimethylene glycol, trimethylpentane diol, neopentyl glycol, trimethylolpropane monoalllyl ether, hydrogenated bisphenol and bisphenol dioxypropyl ether. Illustrative of suitable vinyl monomer are styrene, vinyltoluene, methyl methacrylate, triallyl cyanurate and diallyl phthalate. Auxiliary additives such as an accelerating agent and a stabilizer may be also incorporated in the thermosetting resin composition.

The shaped, expanded body has a skin formed by contact with the inside wall of the mold cavity during the expansion. By removing or destroying the skin portion from the expanded body such as by cutting or piercing, the closed cells adjacent the skin open at the surface thereof. When, therefore, a thermosetting resin is composited on the surface, part of the thermosetting resin layer infiltrates into and anchored in the open cells so that the adhesion strength between the expanded body and the thermosetting layer is significantly improved. In this case, therefore, the amount of the polyene polymer having vinyl group-containing side chains may be reduced.

The following examples will further illustrate the present invention.

EXAMPLES 1–5 AND COMPARATIVE EXAMPLES 1–4

Preparation of Resin Pellets

TABLE 1

| Pellet | Resin | | | | | | Average |
|---|---|---|---|---|---|---|---|
| No. | (I) | (II) | (III) | (IV) | (V) | (VI) | Weight (mg) |
| (1) | 80 | | 20 | | | | 2 |
| (2) | 70 | | 30 | | | | 2 |
| (3) | | 80 | 20 | | | | 4 |

TABLE 1-continued

| Pellet No. | Resin (I) | (II) | (III) | (IV) | (V) | (VI) | Average Weight (mg) |
|---|---|---|---|---|---|---|---|
| (4) | 97 | 3 | | | | | 2 |
| (5) | | | 100 | | | | 2 |
| (6) | | | | | 100 | | 2 |
| (7) | 83.3 | | | | | 16.7 | 2 |

One or two resins shown in Table 1 above were charged in amounts (part by weight) shown in Table 1, melted and kneaded in an extruder and extruded into a strand. The strand was rapidly cooled and cut into cylindrical pellets (1)–(7) having an average weight (per one particle) shown in Table 1. In Table 1, Resins (I)–(VI) are as follows:

Resin I: Propylene-ethylene random copolymer having an ethylene content of 2.4 weight %, MFI (load: 2.16 kgf/cm$^2$) of 4 g/10 minutes at 230° C. and a melting point of 144° C.;

Resin II: Linear low density polyethylene having a density of 0.925 g/cm$^3$, MFI (load: 2.16 kgf/cm$^2$) of 2 g/10 minutes at 190° C. and a melting point of 121° C.;

Resin III: 1,2-Polybutadiene having MFI (load: 2.16 kgf/cm$^2$) of 3 g/10 minutes at 150° C. and a melting point of 110° C.;

Resin IV: Methyl methacrylate-modified propylene-ethylene random copolymer (modified Resin I) having a methyl methacrylate content of 25% by weight, MFI (load: 2.16 kgf/cm$^2$) of 15 g/10 minutes at 230° C. and a melting point of 142° C.;

Resin V: Styrene-modified propylene-ethylene random copolymer (modified Resin I) having a styrene content of 15% by weight, MFI (load: 2.16 kgf/cm$^2$) of 14 g/10 minutes at 230° C. and a melting point of 143° C.;

Resin VI: Maleic anhydride-modified propylene-ethylene random copolymer (modified Resin I) having a maleic anhydride content of 3% by weight, MFI (load: 2.16 kgf/cm$^2$) of 100 g/10 minutes at 230° C. and a melting point of 143° C.

Preparation of Expanded Particles

In an autoclave were charged 100 parts by weight of each Pellets No. (1)–(7), 300 parts by weight of water, 0.3 part of kaolin, 0.004 part of sodium dodecylbenzenesulfonate and a quantity (part by weight per 100 parts by weight of the pellets) of carbon dioxide (a blowing agent) as shown in Table 2 below. The dispersion in the autoclave was held at the temperature and for the period of time shown in Table 2 with stirring. In the case of Pellets Nos. (1), (2) and (4)–(7), the holding of the dispersion was performed in two steps (at two different temperatures for 15 minutes each). Then, while retaining the temperature of the dispersion, one end of the autoclave was opened to discharge the dispersion, thereby obtaining Expanded Particles Nos. (1)–(7) from Pellets Nos. (1)–(7), respectively. Throughout the expansion, carbon dioxide gas is fed to the autoclave to maintain the pressure unchanged. The DSC analysis of Expanded Particles Nos. (1)–(7) revealed the characteristic peak, high temperature peak and reaction peak as shown in Table 2.

TABLE 2

| Expanded Particles No. | Amount of Blowing Agent | Holding Temperature (°C.)/Time (minutes) | Expansion Ratio* | Characteristic Peak (°C.) | High Temperature Peak (°C.) | Reaction (°C.) |
|---|---|---|---|---|---|---|
| (1) | 5 | 147/15 152/15 | 18 | 140 | 162 | 342 |
| (2) | 6 | 147/15 152/15 | 23 | 139 | 163 | 350 |
| (3) | 8 | 121/15 | 11 | 114 | 124 | 341 |
| (4) | 5 | 147/15 152/15 | 20 | 140 | 162 | 308 |
| (5) | 4 | 148/15 153/15 | 30 | 138 | 164 | none |
| (6) | 4 | 148/15 153/15 | 30 | 138 | 164 | none |
| (7) | 5 | 148/15 153/15 | 30 | 138 | 164 | none |

*Bulk expansion ratio (ratio of the true density of unexpanded particles to the bulk density of expanded particles)

Preparation of Shaped Expanded Body

Expanded Particles No. 1–7 were each allowed to stand at ambient temperature and pressure for 24 hours and thereafter filled in a mold cavity and heated with pressurized steam under the pressure shown in Table 3 for further expansion thereof, thereby obtaining plate-like Shaped Expanded Bodies Nos. 1–7 each having a size of 300 mm×300 mm×40 mm. The expansion ratio and the fusion between cells of the Expanded Bodies are shown in Table 3. The fusion between cells is measured as follows:

Expanded body sample is cut into an elongated plate having a size of 10 mm×50 mm×100 mm. The plate is longitudinally drawn until breakage. The cracked surface is observed to count the number of the expanded particles which have been separated as such from adjacent expanded particles without breakage of the cells. Fusion is rated as follows:

A . . . Separated particles are less than 40% (good adhesion)

B . . . Separated particles are 40% to 60% (fair adhesion)

C . . . Separated particles are more than 60% (poor adhesion).

TABLE 3

| Shaped Expanded Body | Pressure of Steam (kg/cm²G) | Expansion Ratio | Fusion Between Cells |
| --- | --- | --- | --- |
| (1) | 3.4 | 17 | A |
| (2) | 3.4 | 20 | A |
| (3) | 1.0 | 10 | A |
| (4) | 3.4 | 19 | A |
| (5) | 3.6 | 28 | A |
| (6) | 3.4 | 28 | A |
| (7) | 3.4 | 28 | C |

Lamination of Unsaturated Polyester Layer

Each of the Shaped Expanded Bodies Nos. (1)–(7) as produced was dried in an oven for 24 hours at 60° C. in the case of Expanded Bodies Nos. (1), (2) and (4)–(7) and at 80° C. in the case of Expanded Body No. (3) and, thereafter, cut into a plate sample having a size of 50 mm×50 mm×10 mm such that one of the two 50 mm×50 mm surfaces provides the cut surface (hereinafter referred to as opened surface) with the other surface being the non-cut surface (hereinafter referred to as closed surface).

A chopped glass fiber strand mat having a basis weight of 450 g/m² and a thickness of 2–2.5 mm was placed on that surface of each of the plate samples which is shown in Table 4 below. An unsaturated polyester resin composition (YUPICA 4007A manufactured by Japan Yupica Inc.) containing methyl ethyl ketone peroxide as a curing catalyst was then impregnated into the mat and hardened by a hand lay-up method to obtain composite materials according to the present invention (Examples 1–6) and comparative examples (Comparative Examples Nos. 1–3) each composed of the shaped expanded body and a fiber-reinforced unsaturated polyester resin layer provided thereon.

Each composite material was then tested for bonding strength and shrinkage to give the results summarized in Table 4. The bonding strength was tested as follows: A sample is set to a tensile tester such that the expanded body and the polyester layer thereof are fixed to the tester. The sample is then drawn in opposite directions at a speed of 10 mm/minute till rupture. The surface of the polyester layer which has been in contact with the expanded body is observed to measure the area of the surface on which the ruptured expanded body remain. The bonding strength is rated as follows:

A: excellent . . . the area is at least 80% of the total area (50 mm×50 mm) of the polyester layer;

B: good . . . the area is less than 80% but not less than 70%;

C: fair . . . the area is less than 70% but not less than 10%;

D: no good . . . the area is less than 10%.

The shrinkage of the composite sample was evaluated to see the degree of shrinkage in the interface between the expanded body and the polyester layer. The shrinkage is rated as follows:

A: No shrinkage is observed;

B: Slight shrinkage is observed;

C: Significant shrinkage is observed.

TABLE 4

| Example No. | Expanded Body No. | Surface Applied With Polyester Layer | Bonding Strength | Shrinkage |
| --- | --- | --- | --- | --- |
| 1 | (1) | Closed Surface | B | A |
| 2 | (2) | Closed Surface | B | A |
| 3 | (3) | Closed Surface | B | A |
| 4 | (1) | Opened Surface | A | A |
| 5 | (2) | Opened Surface | A | A |
| 6 | (4) | Opened Surface | B | A |
| Comp. 1 | (5) | Closed Surface | A | C |
| Comp. 2 | (6) | Closed Surface | A | C |
| Comp. 3 | (7) | Closed Surface | A | A |

As will be seen from the results shown in Table 4, the composite materials of Examples 1–6 according to the present invention give satisfactory bonding strength and are free of shrinkage. Further, since the cells of the expanded body are strongly fuse-bonded to each other (Table 3), the mechanical strengths of the inventive composite materials are high. The bonding strength of the composite material of Example 6 is not very high because of a low content of Resin III (polyene polymer having vinyl group-containing side chains). While the use of modified propylene-ethylene random copolymers (Comparative Examples 1–3) give higher bonding strength than that of Examples 1–3, the shrinkage of the expanded body significantly occurs in Comparative Examples 1 and 2. The composite material of Comparative Example 3 has poor mechanical strengths since, as shown in Table 3, the cells of the expanded body are not firmly bonded to each other.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A composite material comprising a shaped, expanded body having a closed cellular structure, and a layer of a thermosetting resin directly bonded to a surface of said shaped body, said shaped body being formed of a mixed thermoplastic resin having a xylene-insoluble content of not greater than 1% by weight and containing at least 50% by weight of a non-crosslinked polyolefin resin and at least 2% by weight of a non-crosslinked polyene polymer having vinyl group-containing side chains, said polyene polymer containing a monomeric unit having at least two double bonds and selected from the group consisting of butadiene, pentadiene, hexadiene, hexatriene, cyclopentadiene and cyclohexadiene.

2. A composite material as claimed in claim 1, wherein said mixed resin contains secondary crystals.

3. A composite material as claimed in claim 1, wherein said mixed resin contains at least 55% by weight of a non-crosslinked polyolefin and at least 5% by weight of a non-crosslinked 1,2-polybutadiene.

4. A composite material as claimed in claim 1, wherein said mixed resin consists of 55–95% by weight of a non-crosslinked polyolefin and 5–45% by weight of a non-crosslinked 1,2-polybutadiene.

5. A composite material as claimed in claim 1, wherein said surface has been processed so that part of said closed cells open at said surface, and wherein said layer is anchored in said open cells.

6. A composite material as claimed in claim 1, wherein said layer is obtained by a method including the steps of coating said surface with a curable composition containing said thermosetting resin and curing said composition.

7. A composite material as claimed in claim 6, wherein said thermosetting resin is an unsaturated polyester resin and wherein said curable thermosetting resin composition includes a solution of said unsaturated polyester in a liquid vinyl monomer.

8. A composite material as claimed in claim 1, wherein said layer includes a matrix of said thermosetting resin and reinforcing fibers dispersed in said matrix.

9. A composite material as claimed in claim 1 wherein said shaped body is formed from a melt blend of said non-crosslinked polyolefin and said non-crosslinked polyene polymer.

10. A composite material as claimed in claim 1 wherein said non-crosslinked polyolefin is selected from the group consisting of polyethylene, polypropylene, polypropylene-olefin random copolymers and propylene-olefin block copolymers.

11. A composite material as claimed in claim 10 wherein said shaped body is formed from a melt blend of said non-crosslinked polyolefin and said non-crosslinked polyene polymer.

* * * * *